United States Patent
Nobumoto et al.

[11] Patent Number: 5,819,128
[45] Date of Patent: *Oct. 6, 1998

[54] FILM FEEDING CONTROL DEVICE

[75] Inventors: Yushi Nobumoto, Amagasaki; Katsuhiro Ono, Sakai, both of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 607,788

[22] Filed: Feb. 27, 1996

[30] Foreign Application Priority Data

Feb. 27, 1995 [JP] Japan ................................ 7-038098

[51] Int. Cl.$^6$ ...................................................... G03B 1/00
[52] U.S. Cl. ........................ 396/411; 396/269; 396/397; 396/535
[58] Field of Search .................................... 354/217, 218; 396/273, 268, 269, 392, 397, 398, 389, 411, 535

[56] References Cited

U.S. PATENT DOCUMENTS

| | | | |
|---|---|---|---|
| 4,209,692 | 6/1980 | Hudspeth | 250/239 |
| 4,309,605 | 1/1982 | Okabe | 250/239 |
| 5,049,908 | 9/1991 | Murakami | 354/173.1 |
| 5,345,286 | 9/1994 | Stiehler | 354/173.1 |
| 5,504,549 | 4/1996 | Kazami et al. | 354/173.1 |
| 5,517,266 | 5/1996 | Funaki et al. | 354/106 |
| 5,548,363 | 8/1996 | Ohtsuka | 354/173.1 |
| 5,565,912 | 10/1996 | Easterly et al. | 348/96 |
| 5,625,850 | 4/1997 | Nishinou | 396/269 |

FOREIGN PATENT DOCUMENTS

| | | |
|---|---|---|
| 57-39031U | 3/1982 | Japan . |
| 61-114426U | 7/1986 | Japan . |
| 3-60330U | 6/1991 | Japan . |

OTHER PUBLICATIONS

"A Guidebook of Electronic Parts," Electric Technique Magazine, Oct., 1987, p. 89.

*Primary Examiner*—Safet Metjahic
*Assistant Examiner*—John Chizmar
*Attorney, Agent, or Firm*—Sidley & Austin

[57] ABSTRACT

A control device for feeding and positioning a film precisely, in a camera, a printing apparatus, etc., includes a photo interrupter with a light emitter, a light detector for detecting a light emitted from the light emitter, and a holding member for keeping both the light emitter and the light detector in position; a frame with a guiding member for guiding a film having a longitudinal edge with a plurality of perforations which travels between the light emitter and the light detector of the photo interrupter; a perforation detector for detecting a perforation based upon a signal outputted from the light detector, which outputs the signal each time a perforation of the film edge passes a location corresponding to an optical axis existing between the light emitter and the light detector; and a controller for controlling a film feeding operation in accordance with the detection of a perforation by the perforation detector.

35 Claims, 11 Drawing Sheets

FILM FEEDING CONTROL DEVICE

BACKGROUND OF THE INVENTION

1. Field of the Invention.

The present invention generally relates to a film feeding control device which can be used in a camera, a printing apparatus, etc., and particularly relates to a construction of a photo interrupter for detecting perforations of a film to control the feeding thereof and to a structure for mounting the photo interrupter on a frame of the camera, etc.

2. Description of the Related Art

Conventionally, there has been provided a camera with a film feeding control device having a photo reflector for detecting perforations of the film so that the amount of the film fed is detected, as disclosed in Japanese Laid-Open Utility Model Application Nos. 61-114426 and 3-60330.

Meanwhile, there has been proposed a camera with a film feeding control device having a mechanism for detecting perforations of the film so that not only the amount of the film fed is detected, but also a frame of the film is positioned with respect to an aperture of the camera. In order to realize a precise positioning of the frame of the film relative to the aperture of the camera, a precise detection of the perforations of the film is required.

Here, if the photo reflector of the former type of camera is applied to the mechanism of the latter type of camera, it is difficult to detect the perforations of the film precisely to such a degree that the frame of the film can be positioned precisely with respect to the aperture, as explained below.

The photo reflector is so constructed that light emitted from a light emitting part of the photo reflector, is reflected from the film surface towards a light detecting part of the photo reflector, with the light detecting part being disposed on the same side as the light emitting part relative to a film surface. In other words, the precision in detecting the perforations of the film partly depends upon the condition of the film surface such as its flatness and reflectivity, and partly depends upon the relative position of the light emitting part with respect to the light detecting part of the photo reflector.

Because of the foregoing reason, it is difficult for the frames of the film to be positioned precisely relative to the aperture of the camera with the mechanism employing the photo reflector.

SUMMARY OF THE INVENTION

Therefore, an object of the present invention is to provide a film feeding control device with a mechanism for precisely detecting perforations of the film.

Another object of the present invention is to provide a mounting structure for mounting the mechanism on a frame of a camera, a printing apparatus, etc.

Still another object of the present invention is to provide a method for mounting the mechanism on the frame.

In accomplishing these and other objects of the present invention, there is provided a film feeding control device comprising: a photo interrupter which has a light source for emitting a light, a light detector for detecting the light emitted from the light source and for outputting a detecting signal in accordance with a detection of the light, and a holding member for holding the light source and the light detector; a guiding member for guiding a film between the light source and the light detector; a perforation detector for detecting a perforation of the film based on the detecting signal outputted from the light detector; and a controller for controlling a film feeding operation in accordance with a detection of the perforation by the perforation detector.

With this invention, when a perforation of the film travels between the light source and the light detector of the photo interrupter while the film is being guided by the guiding member, the light emitted from the light source passes through the perforation of the film and reaches the light detector to output the detecting signal, which in turn is detected by the perforation detector. Thus the film feeding operation is controlled in accordance with the detection of the perforation by the controller.

According to this invention, because the detection of the perforation of the film is performed by the photo interrupter, the accuracy of the detection of the perforation of the film is not affected by the condition of the film surface, such as its flatness, nor by the reflection angle of the light on the film. This is in contrast to the effect in the photo reflector of the relative position between the light source and the light detector, which is located on the same side as the light source relative to the film surface. Thus, with the present invention, the detection of the perforation of the film is performed precisely.

In this invention, the controller, for example, controls an amount of the film fed, and/or controls a position of the film relative to an aperture of the film feeding control device.

Specifically, the film feeding control device comprises a frame which has an opening, and a guide surface along which a film is fed; a photo interrupter which is mounted in the opening of the frame, wherein the photo interrupter has a light source for emitting a light, a light detector for detecting the light emitted from the light source, and a holding member for holding the light source and the light detector; and a fixing member for fixing the photo interrupter in the opening of the frame.

In the structure, the photo interrupter can be mounted in the opening of the frame so that a surface, on the side opposite the guide surface, of the photo interrupter is level with a surface, on the same side, of the frame.

According to the structure, because a part of the photo interrupter is inset in an opening in the frame, and is not mounted on a surface of the frame, it is possible to reduce the thickness of the part of the frame at which the photo interrupter is mounted on the thus realizing a compact apparatus such as a compact camera and a compact printing apparatus if the invention is applied thereto.

In this structure, it is preferable to provide a shield member for prevent a light from passing through a chink between an inner peripheral surface, forming the opening of the frame, and an outer peripheral surface of the holding member of the photo interrupter.

With this structure, a careless exposure of the film to the light passing through them is surely prevented.

Specifically, the frame further comprises a first contact surface which is provided around the opening, wherein the photo interrupter further comprises a second contact surface which is provided around a side wall of the holding member and which contacts the first contact surface of the frame when the photo interrupter is mounted in the opening of the frame.

More specifically, for example, the photo interrupter may have a flange-like part on each side of the holding member, wherein the second contact surface is formed on the flange-like part. For example, the second contact surface may be formed on a step-like part provided on the side wall of the holding member of the first contact surface of the frame may be formed tapering in a direction opposite the guide surface thereof, and the second contact surface of the photo interrupter formed tapering so as to be complementary with respect to the first contact surface of the frame.

According to the various structures, because the first contact surface of the frame and the second contact surface of the photo interrupter are so formed that either light does not leak from one side of the frame to the other side thereof through the mounting surface therebetween, or the mounting surface which the light may enter is not constructed straight nor parallel in a direction from one side of the frame to the other side thereof, leaking of the light in a direction of the thickness of the frame is effectively prevented.

In the case where the photo interrupter is of a type in which it has a flange-like part on each side of the holding member, wherein the second contact surface is formed on the flange-like part, or in the case where the photo interrupter is of a type in which the second contact surface is formed on a step-like part provided on the side wall of the holding member, the photo interrupter is so fixed in the opening of the frame that the first and second contact surfaces are substantially parallel to a surface of the film fed, or the flange extends in a plane perpendicular to an optical axis along which the light travels between the light source and the light detector, or the flange extends in a plane parallel to an emitting surface of the light source or to a detecting surface of the light detector.

The flange provided around the holding member may be in a continuous, annular square form, or may be in a discontinuous, annular square form, wherein the flange comprises separate pieces a respective of which corresponds to a respective side of the holding member.

In this structure, it is preferable that the flange has a flat surface, and that the flat surface is perpendicular to an optical axis along which the light travels between the light source and the light detector.

In order to mount the photo interrupter on a frame, there is provided the mounting method, comprising the steps of: providing the frame with an opening; providing the frame with a first contact surface around the opening; providing a holding member of the photo interrupter element with a second contact surface corresponding to the first contact surface of the frame, wherein the holding member holds a light source for emitting a light and a light detector for detecting the light emitted from the light source; and mounting the holding member of the photo interrupter element in the opening of the frame, with the first contact surface of the frame contacting the second contact surface of the holding member.

The mounting method, for mounting the photo interrupter on the frame, contributes towards a manufacture of the film feeding control device in a compact size, thus making it possible to realize any apparatus provided with the control device in a small size.

The method may further comprise the step of fixing the first contact surface of the frame to the second contact surface of the holding member of the photo interrupter element by an adhesive.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
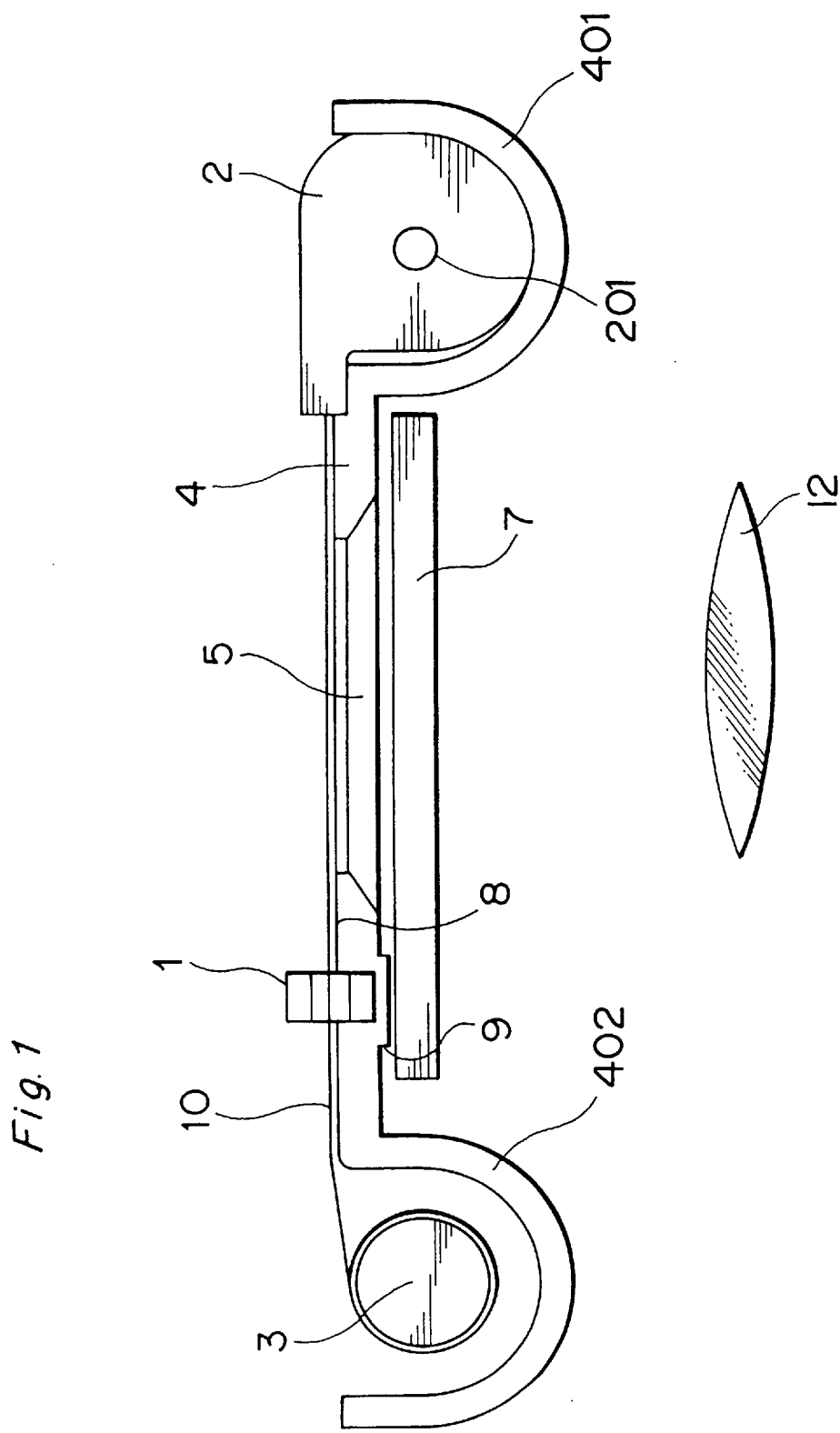
FIG. 1 is an explanatory, general view of a camera in which a film feeding control device with a photo interrupter, according to a first embodiment of the present invention, is provided.

Before the description of the present invention proceeds, it is to be noted that like parts are designated by like reference numerals, with different alphabetic letters added after the corresponding numerals for different embodiments except a first embodiment, throughout the accompanying drawings.

Referring to FIGS. 1 through 18, a full description of the present invention is made below on a film feeding control device, with a photo interrupter and a mounting structure for mounting the photo interrupter on a camera frame, according to a first through a ninth embodiment of the present invention.

First, referring to FIGS. 1 through 4, a description is made on a film feeding control device, with a photo interrupter and a mounting structure for mounting the photo interrupter on a camera frame, according to a first embodiment of the present invention.

FIG. 1 is an explanatory general view showing a camera having the film feeding control device in which the photo interrupter and the mounting structure for mounting the photo interrupter on the camera frame are provided. In FIG. 1, a reference numeral 4 points to the camera frame which supports various components and members, 401 to a wall forming a cartridge chamber inside which a film cartridge 2 with its cartridge spool 201 is set, 3 to a film winding spool of the camera, 402 to a spool chamber housing the film winding spool 3, 10 to a length of a film extending between the film cartridge 2 and the film winding spool 3 with a leader of the film 10 being wound around the film winding spool 3, 8 is a railing surface, provided on the frame 4, functioning as a surface for guiding the film 10 which is pulled out of the film cartridge 2 towards the film winding spool 3, 5 to an aperture for exposing the film 10 to light, 7 to a shutter, 12 to a photographing lens, and 1 to the photo interrupter.

With this mechanism, when the shutter 7 is opened, a light from outside the camera passes through the photographing lens 12, the shutter 7, and the aperture 5 to expose the portion of the film 10 adjacent the aperture 5 to light.

Figure 2:
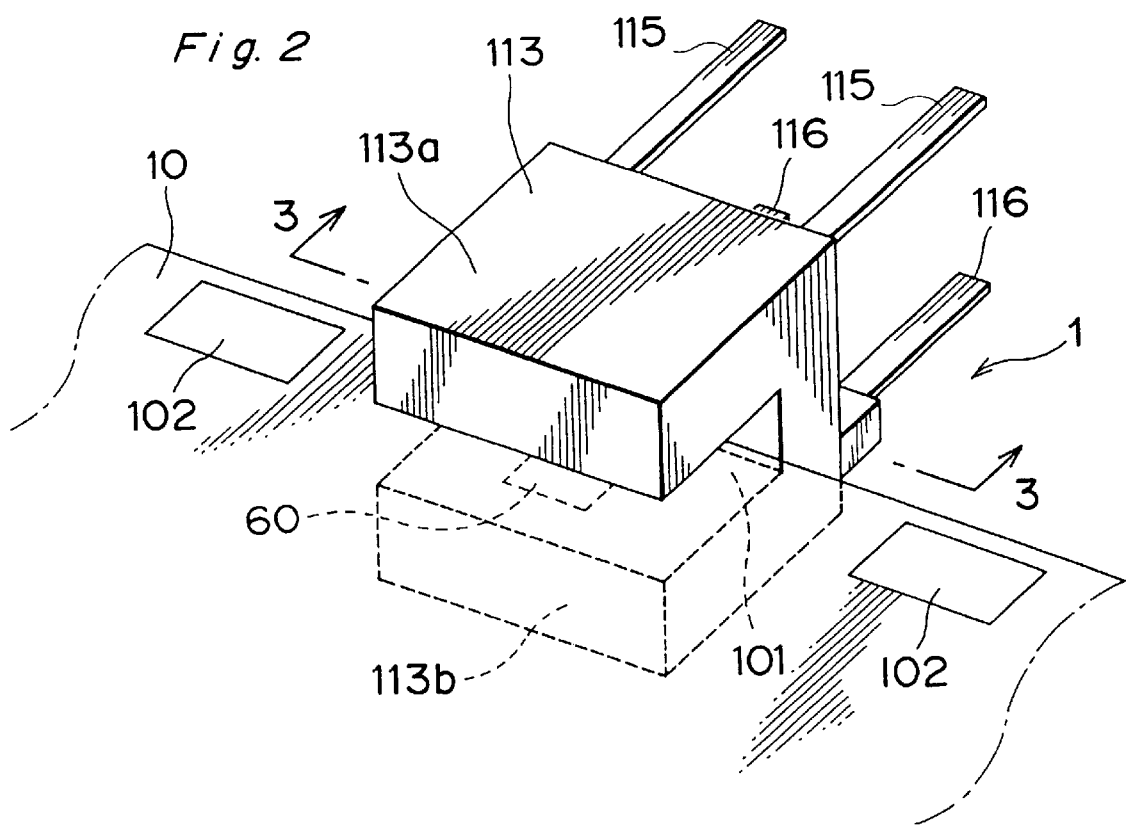
FIG. 2 is an enlarged perspective view of a photo interrupter shown in FIG. 1.
Figure 3:
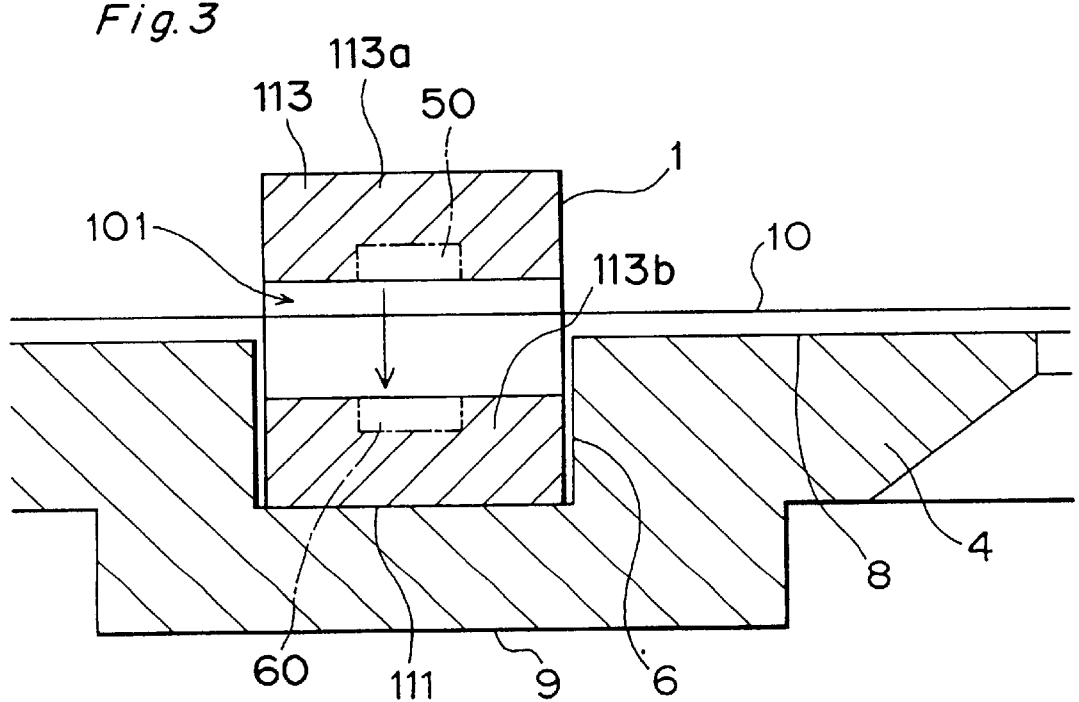
FIG. 3 is a partial, enlarged sectional view taken approximately on a line corresponding with 3—3 in FIG. 2.

The photo interrupter 1 is illustrated as an enlarged perspective view in FIG. 2, and the mounting structure of the photo interrupter 1 is illustrated as an enlarged sectional view in FIG. 3, respectively. The photo interrupter 1 has a light emitting part 50 which is comprised of a LED, for example, and a light detecting part 60 which is comprised of a photo diode. The light emitting part 50 and the light detecting part 60 are held together by two legs 113a and 113b in a U-shape of a supporting member 113 of the photo interrupter 1.

Also, as shown in FIG. 2, the photo interrupter 1 has a pair of first electrodes 115, and a pair of second electrodes 116. When a light-emitting signal is inputted to the first electrodes 115, the light emitting part 50 emits a light.

On the other hand, when the light detecting part 60 detects the light emitted from the light emitting part 50, the light-detecting signal is outputted from the second electrodes 116.

When the film 10 is fed between the film cartridge 2 and the film winding spool 3, the film 10 is so guided on the railing surface 8 of the camera frame 4 that the film 10 passes through a slit 101, which is formed between the two legs 113a and 113b of the supporting member 113 which support the light emitting part 50 and the light detecting part 60.

With this mechanism, if a longitudinal edge part, corresponding to each perforation 102, of the film 10 passes between the light emitting part 50 and the light detecting part 60, the light emitted from the light emitting part 50 passes through the perforation 102 to the light detecting part 60.

On the other hand, if the longitudinal edge part, corresponding to no perforation, of the film 10 passes therebetween, the light emitted from the light emitting part 50 is intercepted by the film 10, so that no light reaches the light detecting part 60.

Accordingly, each time a perforation 102 of the film 10 passes between the light emitting part 50 and the light detecting part 60, a light-detecting signal is outputted from the second electrodes 116 of the light detecting part 60. That is, the passing of a perforation 102 of the film between the light emitting part 50 and the light detecting part 60, is detected and outputted in a form of the electrical signal.

The photo interrupter 1 is mounted on the frame 4 with its mounting structure which is provided in a part of the photo interrupter 1 and in a part of the frame 4, as shown in FIG. 3.

That is, as shown in the figure, the frame 4 has a concave part 6, and leg 113b with the light detecting part 60 of the supporting member 113 of the photo interrupter 1 is embedded in the concave part 6 of the frame 4. In order to prevent the supporting member 113 from dropping off the concave part 6 of the frame 4, a side surface 111 of the supporting member 113 is fixed to a bottom surface of the concave part 6 of the frame 4 by means of an adhesive.

According to the first embodiment, the photo interrupter 1 is fixed to the frame 4 by means of the adhesive, as mentioned above; however, the means to fix both members 1 and 4 to each other is not limited to the use of adhesive. For example, the supporting member 113 may be fixed to the frame 4 by means of a screw which taps the frame 4 on a side of the shutter 7 at a desired position thereof towards the supporting member 113 of the photo interrupter 1.

Figure 4:
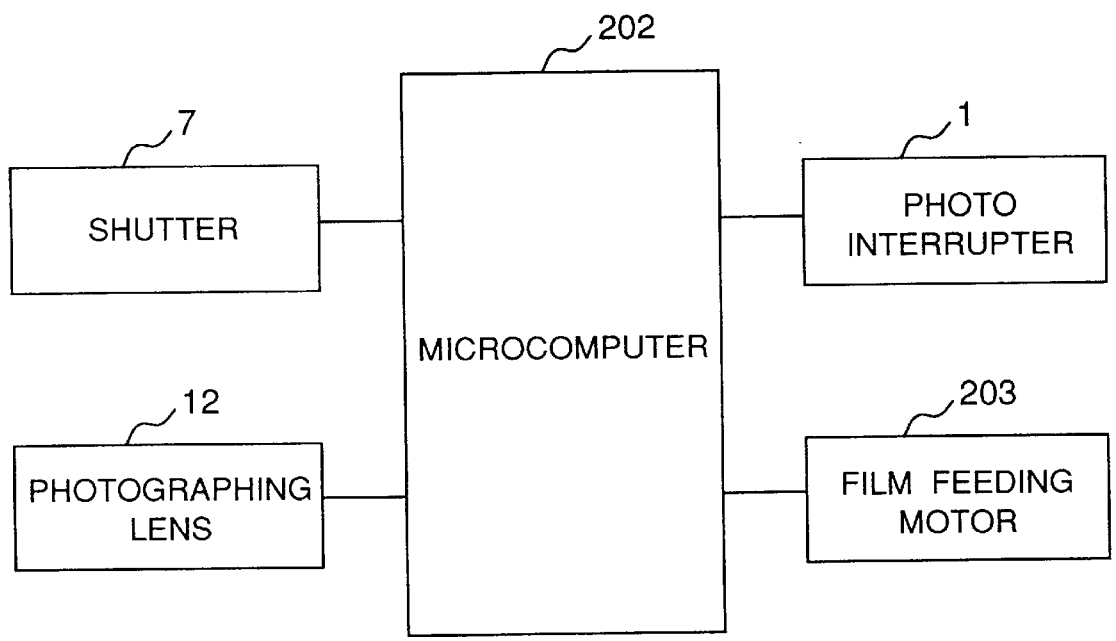
FIG. 4 is a block diagram of the film feeding control device of FIG. 1.

The film feeding control device is controlled by a control unit, provided in the camera, as shown in a block diagram of FIG. 4. That is, the control unit has a microcomputer 202 which controls the general operation of the camera, to which the shutter 7, the photographing lens 12, the photo interrupter 1, and a film feeding motor 203, which is provided in the film feeding control device are electrically connected.

With this mechanism, the shutter 7 and the photographing lens 12 are controlled by the microcomputer 202, respectively. The microcomputer 202 detects any perforation 102 of the film 10 by detecting the light-detecting signal outputted from the second electrodes 116 of the photo interrupter 1, and in turn energizes the film feeding motor 203 to drive the film feeding control device.

The film winding spool 3 and a fork for driving the cartridge spool 201 are, respectively, interlocked mechanically with the film feeding motor 203, so that the film 10 is fed from the film cartridge 2 towards the film winding spool 3, or the film 10 is fed from the film winding spool 3 back to the film cartridge 2.

In the first embodiment, the control for the amount of the film 10 fed between the film winding spool 3 and the film cartridge 2, and for the positioning of any frame of the film 10 with respect to the aperture 5, is performed by the microcomputer 202 in response to the detection of the perforation 102 of the film 10 by means of the photo interrupter 1, as explained above.

Figure 5:
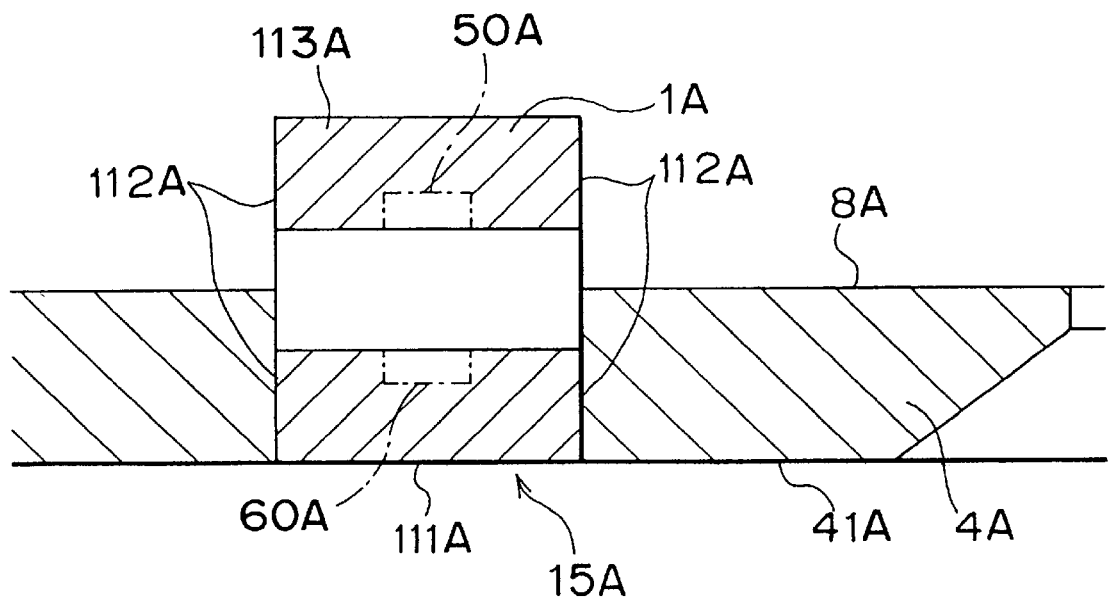
FIG. 5 is a partial, enlarged sectional view, similar to FIG. 3, showing a photo interrupter and a mounting structure, for mounting the photo interrupter on a camera frame, according to a second embodiment of the present invention.

Next, referring to FIG. 5, a description is made of a film feeding control device with a photo interrupter and a mounting structure for mounting the photo interrupter on a camera frame, according to a second embodiment of the present invention.

According to the second embodiment, the frame 4A has a opening 15A which penetrates the frame 4A as shown in FIG. 5, and a part of the supporting member 113A of the photo interrupter 1A is inserted into the opening 15A. In order to prevent the supporting member 113A from dropping out of the opening 15A of the frame 4A, the supporting member 113A is fixed to the frame 4A by means of an adhesive, which is applied to the part of the end surfaces 112A of the supporting member 113A corresponding to an inner peripheral surface of the opening 15A before inserting the supporting member 113A into the opening 15A of the frame 4A.

With the mounting structure of the second embodiment, it is possible to make a side surface 11A, facing the shutter and the photographing lens 12, of the supporting member 113A level or flat with a side surface 41A, facing the shutter 7, of the frame 4A.

Figure 6:
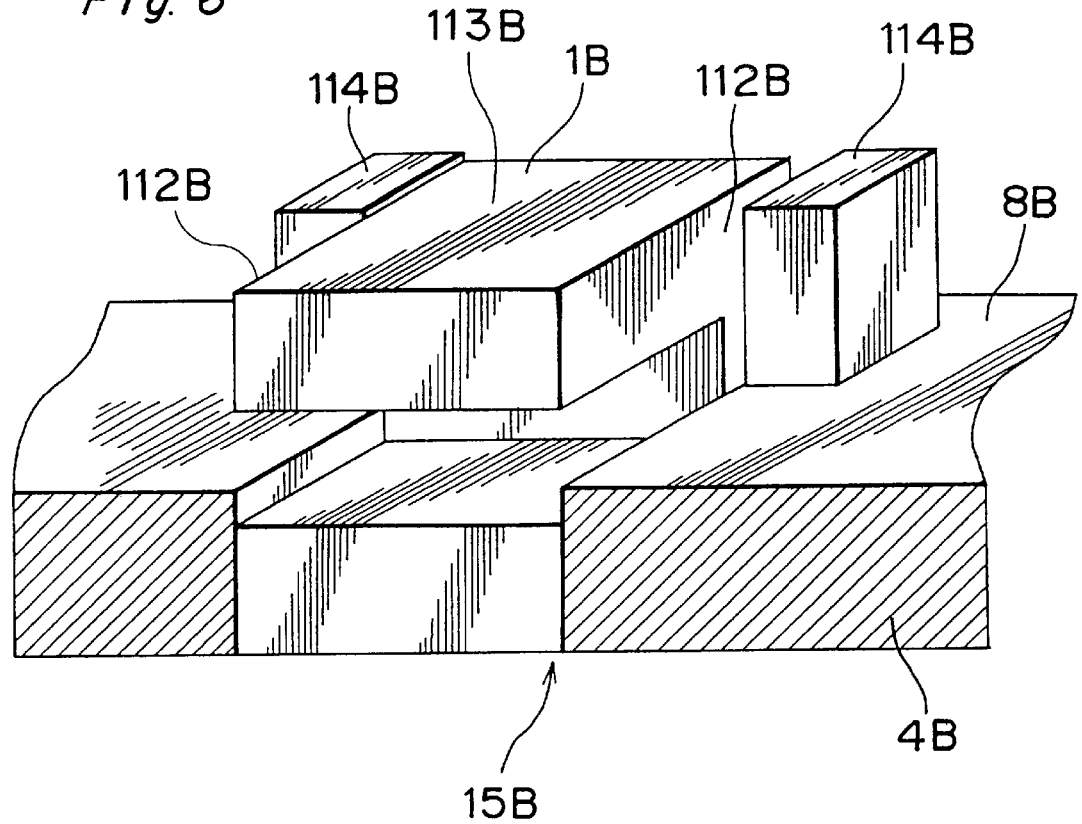
FIG. 6 is a partly sectional, perspective view of a photo interrupter and a mounting structure, for mounting the photo interrupter on a camera frame, according to a third embodiment of the present invention.

Next, referring to FIG. 6, a description is made on a film feeding control device, with a photo interrupter and a mounting structure for mounting the photo interrupter on a camera frame, according to a third embodiment of the present invention.

The third embodiment illustrates a different example of means of fixing a supporting member 113B of the photo interrupter 1B to a camera frame 4B, and employing a pair of fixing members 114B cubic in shape as shown in the figure.

That is, each fixing member 114B is integrated with the camera frame 4B or adhered thereto on a railing surface 8B of the camera frame 4B. A portion of each end surface 112B of the supporting member 113B of the photo interrupter 1B is adhered to the adjacent inner side surface of the fixing members 114B, with the supporting member 113B being inserted in an opening 15B formed in the camera frame 4B.

According to the third embodiment, although the supporting member 113B and the camera frame 4B are mutually fixed by means of the fixing members 114B and the adhesive, the fixing means of both members 113B and 4B are not limited to this example. For instance, the supporting member 113B and the camera frame 4B may be fixed to each other by making a hole through a fixing member 114B and the side 112B and partially through the supporting member 113B, and by fixing them together by driving in a screw from an outer side of the fixing member 114B towards the supporting member 113B.

According to the second and third embodiments, the mounting structure, for mounting the photo interrupter 1A or 1B on the part of the camera frame 4A or 4B, comprises a penetrating hole 15A or 15B, made in a part of the camera frame 4A or 4B, with a peripheral side surface 112A or 112B of the supporting member 113A or 113B of the photo interrupter 1A or 1B being fixed to the inner surface of the penetrating hole 15A or 15B by means of an adhesive. That is, according to the second and third embodiments, there is no need of providing the concave part 6 shown in FIG. 3, for receiving a bottom surface 111, on the side toward the shutter and the photographing lens, of the supporting member 113a of the photo interrupter 1, which is formed with a wall 9 of the frame 4 projecting towards the shutter 7 of the camera. Therefore, with the mounting structure according to the second and third embodiments, it is possible to reduce the thickness of the part of the camera frame, on which the supporting member of the photo interrupter is mounted, thus enabling the design of a compact camera.

Figure 7:
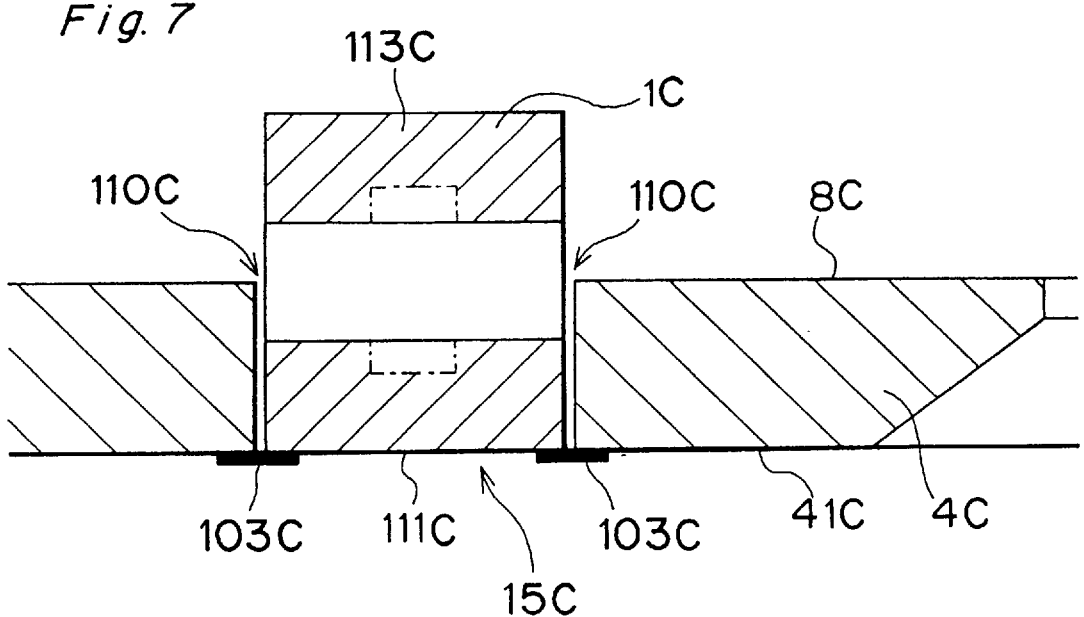
FIG. 7 is a partial, enlarged sectional view, similar to FIG. 3, showing a photo interrupter and a mounting structure, for mounting the photo interrupter on a camera frame, according to a fourth embodiment of the present invention.

Next, referring to FIG. 7, a description is made on a film feeding control device, with a photo interrupter and a mounting structure for mounting the photo interrupter on a camera frame, according to a fourth embodiment of the present invention.

The fourth embodiment illustrates another example in which a supporting member 113C of the photo interrupter 1C is fixed by means of an adhesive to side surfaces of an opening 15C formed in the frame 4C. The adhesive is applied to the portions of the side surfaces of the supporting member 113C, corresponding to an inner peripheral surface of the opening before 15C, before inserting the supporting member 113C is inserted into the opening 15C of the frame 4c.

As shown in FIG. 7, the supporting member 113C is fixed to the part of the camera frame 4C so as to level the surface 111C of the supporting member 113C with the surface 4C, both facing the shutter 7 and the photographing lens 12 of the camera. With this structure, a light-intercepting member 103C, such as an adhesive, opaque tape or cloth, is adhered to both the surface 111C of the supporting member 113C and the surface 41C of the camera frame 4C.

When the opening 15C is formed in the camera frame 4C with a low degree of accuracy, there may exist a slight gap, as designated by 110C in FIG. 7, between the peripheral side surfaces of the supporting member 113C of the photo interrupter 1C and the inner surface of the opening 15C of the camera frame 4C. If such a gap between the supporting member 113C of the photo interrupter 1C and the opening 15C of the camera frame 4C exists, light which enters the inside of the camera through the photographing lens, may pass around the shutter and then through the gap 110C to reach the film and undesirably expose it to the light.

According to the mounting structure of the fourth embodiment, however, the gap 110C between the photo interrupter 1C and the hole 15C of the camera frame 4C is covered by the light-intercepting member 103C; accordingly, the passing of light through the gap 110C is surely prevented. In other words, according to the fourth embodiment, no matter how inaccurately the opening 15C is made in the camera frame 4C, undesirable exposure of the film to light is prevented. As a result, it is possible to reduce the number of steps by which the opening 15C of the frame 4C and the outer side of the supporting member 113C of the photo interrupter 1C are formed.

Next, referring to FIGS. 8, 9, 10 and 11, a description is made on a film feeding control device, with a photo interrupter and a mounting structure for mounting the photo interrupter on a camera frame, according to a fifth embodiment of the present invention.

Figure 8:
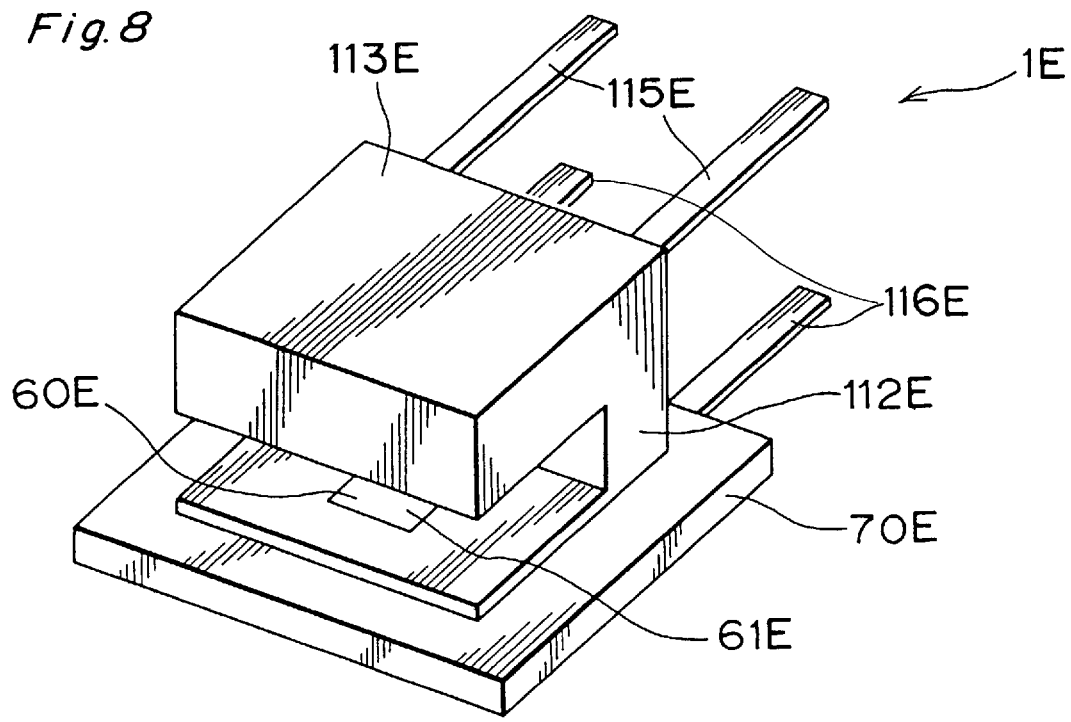
FIG. 8 is a perspective view of a photo interrupter according to a fifth embodiment of the present invention.
Figure 9:
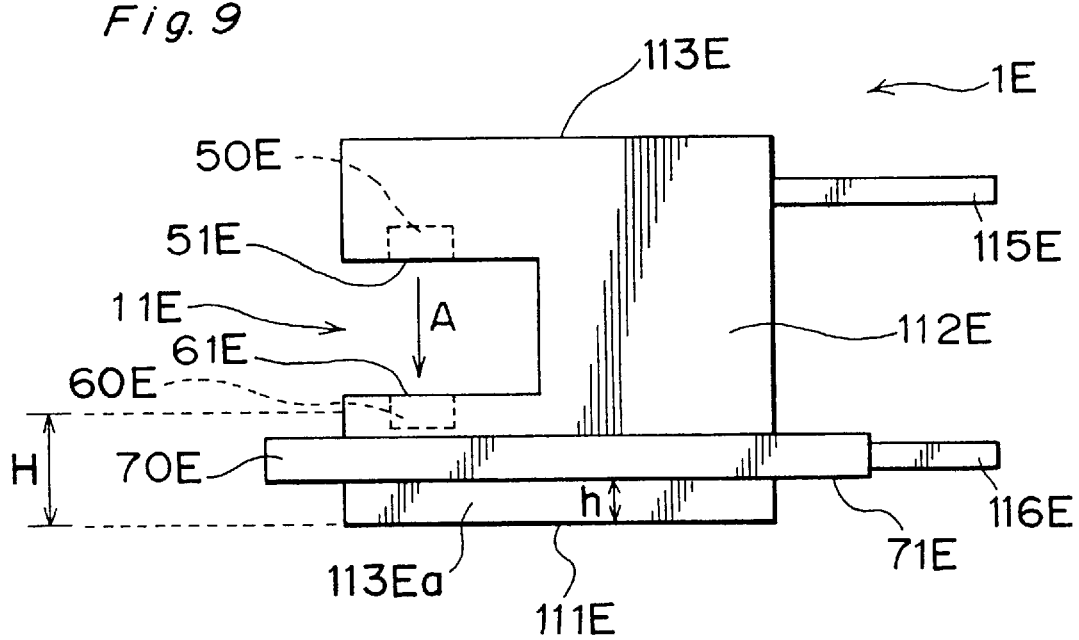
FIG. 9 is a side elevation view of the photo interrupter shown in FIG. 8.
Figure 10:
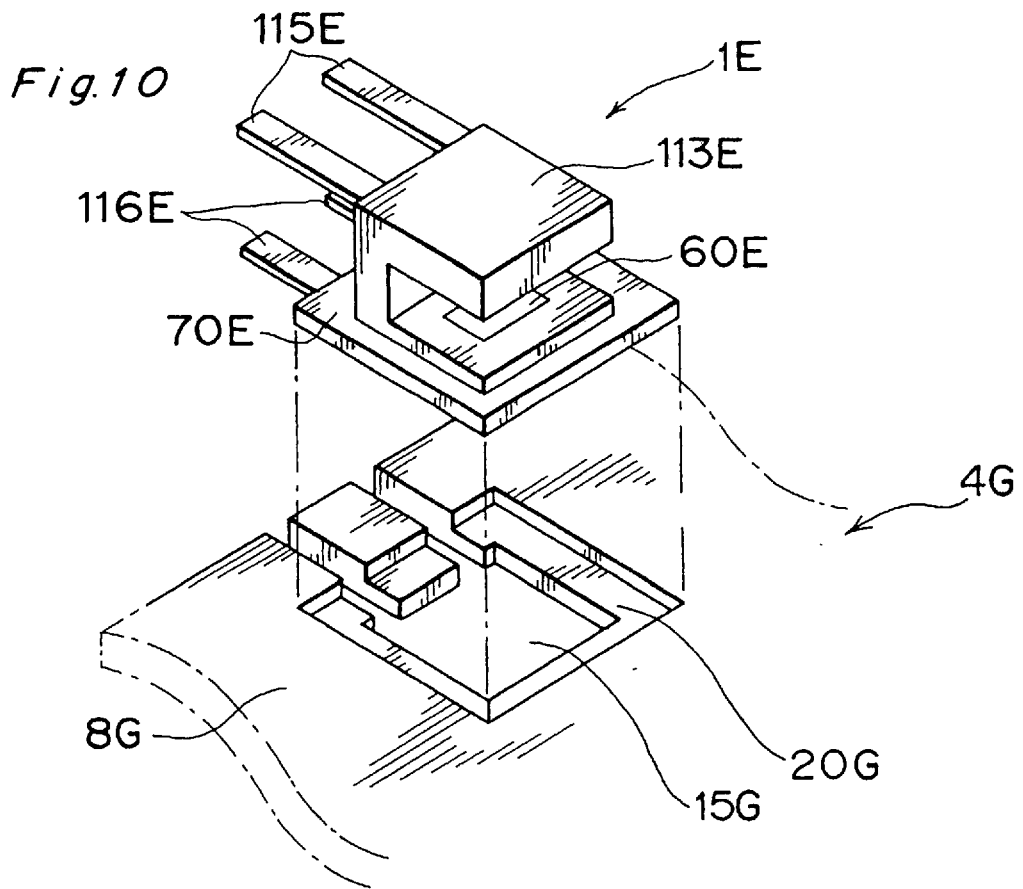
FIG. 10 is an explanatory, exploded perspective view of a mounting structure for mounting the photo interrupter, shown in FIGS. 8 and 9, on a camera frame.
Figure 11:
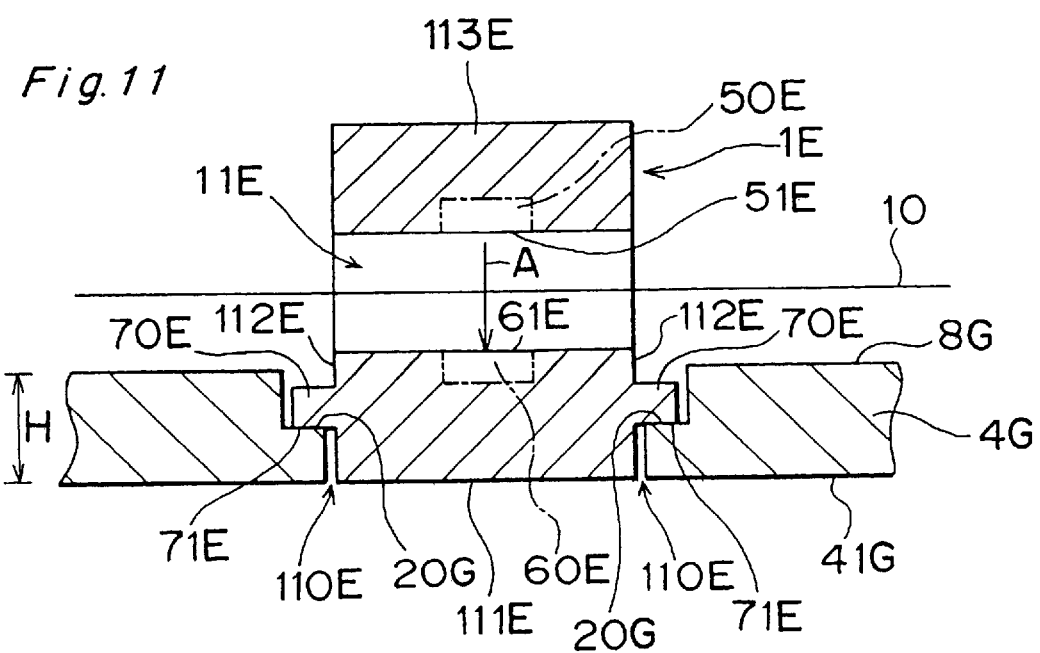
FIG. 11 is a sectional view, similar to FIG. 3, showing the photo interrupter and its mounting structure of FIG. 10.

FIG. 8 illustrates the photo interrupter 1E of the fifth embodiment; FIG. 9 illustrates the photo interrupter 1E as a side elevation view thereof; and FIGS. 10 and 11 illustrate a mounting structure for mounting the photo interrupter, shown in FIGS. 8 and 9, on a part of a camera frame.

As shown in the figures, the photo interrupter 1E is provided with a light emitting part 50E and a light detecting part 60E. The light emitting part 50E, the light detecting part 60E, a pair of the first electrodes 115E electrically connecting to the light emitting part 50E, and a pair of the second electrodes 116E electrically connecting to the light detecting part 60E, are all supported by the supporting member 113E of the photo interrupter 1E. In the figures, 51E designates a light emitting surface of the light emitting part 50E and 61E designates a light detecting surface of the light detecting part 60E.

The supporting member 113E of the photo interrupter 1E has a flange-like projection 70E which surrounds a peripheral side surface 112E of the supporting member 113E. The flange-like projection 70E is formed perpendicular to an optical axis "A" extending between the light emitting part 50E and the light detecting part 60E, or is formed parallel to the light emitting surface 51E or the light detecting surface 61E.

The flange-like projection 70E has a surface, opposite a slit 11E through which the film 10 is passed, which is constructed to be a contacting surface 71E that contacts a contacting surface 20G (explained later) formed around an opening 15G in a camera frame 4G. The contacting surface 71E of the flange-like projection part 70E is also formed perpendicular to the optical axis A extending between the light emitting part 50E and the light detecting part 60E, or is formed parallel to the light emitting surface 51E or the light detecting surface 61E.

The photo interrupter 1E of the fifth embodiment is mounted on a part of the camera frame 4G. The camera frame 4G has an opening 15G in which the supporting member 113E of the photo interrupter 1E is inserted. The opening 15G is designed so as to correspond to the dimension of the part, on the side facing the shutter or the photographing lens, of the supporting member 113E of the photo interrupter 1E.

The part of the camera frame 4G has a contacting surface 20G which is so provided around the opening 15G that the contacting surface 20G is formed step-like nearer the surface on the side facing the shutter with respect to the railing surface 8G. The contacting surface 20G of the camera frame 4G is formed parallel to the railing surface 8G of the camera frame 4G.

With this mounting structure, when an edge part with a surface 111E, on the side facing the shutter, of the supporting member 113E of the photo interrupter 1E is inserted inside the opening 15G, the contacting surface 71E of the flange-like projecting part 70E contacts the contacting surface 20G of the camera frame 4G, with the surface 41G, on the side facing the shutter, of the camera frame 4G being level with the surface 111E, on the same side, of the supporting member 113E of the photo interrupter 1E.

With the contacting surface 20G of the camera frame 4G contacting the contacting surface 71E of the supporting member 113E of the photo interrupter 1E, the supporting member 113E and the camera frame 4G are fixed to each other by means of any fixing means such as an adhesive or screw.

As shown in FIG. 11, when the photo interrupter 1E is mounted on the camera frame 4G, the optical axis "A" of the photo interrupter 1E, the light emitting surface 51E of the light emitting part 50E, and the light detecting surface 61E of the light detecting part 60E, the flange-like projecting part 70E, and the contacting surface 71E are all parallel to the film surface or film 10.

According to the mounting structure of the fifth embodiment, since the thickness of the portion of the frame providing surface 20G around the opening 15G of the camera frame 4G is smaller than the thickness of the other part of the camera frame 4G so that the surface, on the side facing the shutter, of the interrupter 1E is flat with the surface, on the same side, of the camera frame 4G, it is possible to construct a thin mounting part or wall of the camera frame 4G.

In addition, according to the mounting structure of the fifth embodiment, the flange-like projecting part 70E functions as a barrier to prevent the passage of light between the photo interrupter 1E and the surrounding frame 4G. Consequently, a light coming in through the photographing lens and passing around the shutter is prevented from passing between the peripheral surface 112E of the supporting member 113A and the inner surface of the opening 15G of the camera frame 4G towards the film to expose it, even if there exists a gap between the peripheral surface 112E of the supporting member 113A and the inner surface, on the side facing the shutter, of the opening 15G of the camera frame 4G.

As shown in FIGS. 10 and 11, the flange-like projecting part 70E with its contacting surface 71E of the interrupter 1E is provided around the supporting member 113E thereof; therefore, the leaking of light between the peripheral surface 112E of the supporting member 113A and the inner surface of the opening 15G of the camera frame 4G towards the film is effectively prevented.

In the connection, as shown in FIGS. 10 and 11, the first and second electrodes 115E and 116E of the photo interrupter 1E are mounted on the supporting member 113E so that the electrodes 115E and 116E are perpendicular to the optical axis "A" and parallel to both the light emitting surface 51E and the light detecting surface 61E.

Here, the mounting position of the flange-like projecting part 70E with respect to the supporting member 113E of the photo interrupter 1E is not limited to what is shown in the figures. For example, referring to FIGS. 9 and 11, the space or length "h" between the surface 111E, on the side facing the shutter, of the supporting member 113E and the contacting surface 71E of the flange-like projecting part 70E can be voluntarily altered within a range of space or length "H", which substantially corresponds to a thickness of one leg 113Ea, on the side facing the shutter, of the supporting member 113E so that the surface 111E, on the side of the shutter, of the supporting member 113E is level with the surface 41G, on the same side, of the camera frame 41G.

Also, the arrangement of the light emitting part 50E and the light detecting part 60E is not limited to what is illustrated in the figure. For example, as a modification to the fifth embodiment, the light emitting part and the light detecting part may be reversed in position with respect to the supporting member 113E of the photo interrupter 1E.

Also, according to the fifth embodiment, the flange-like projecting part 70E is disposed on the side of the light detecting part 60E; however, the position of the flange-like projecting part is not limited to the illustrated embodiment. For example, the flange-like projecting part may be mounted on the side of the supporting member 113E on the side of the light emitting part 50E.

Figure 12:
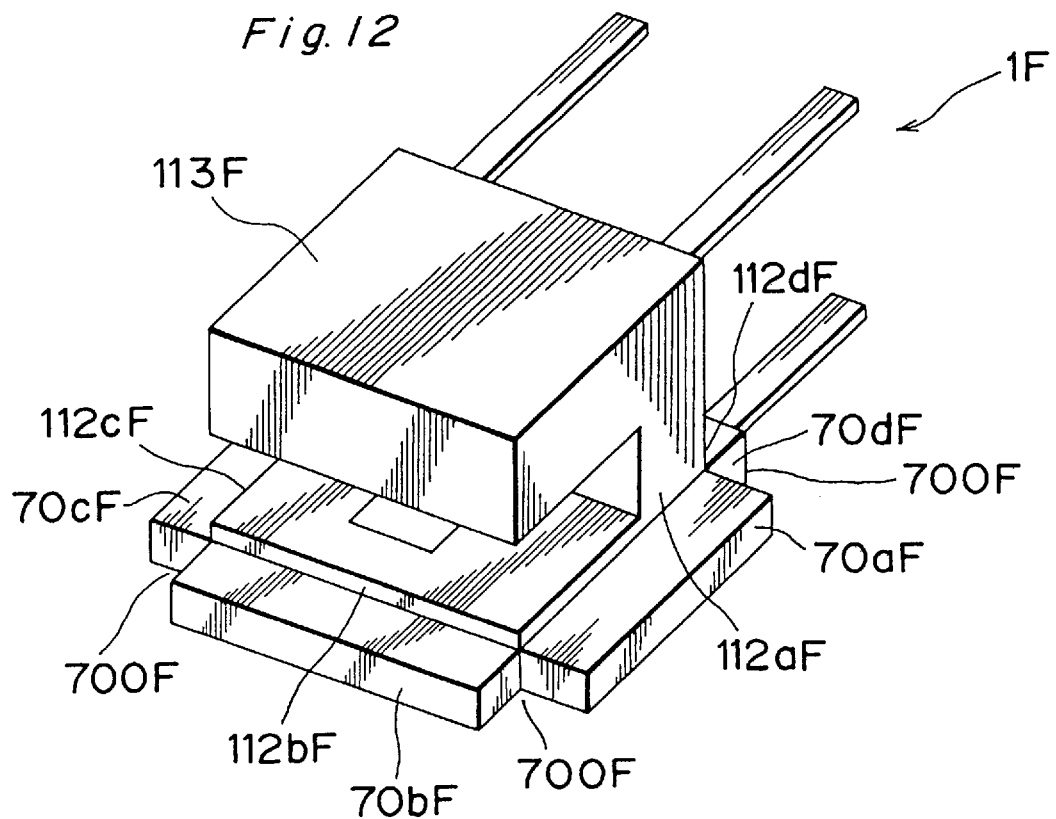
FIG. 12 is a perspective view of a photo interrupter, similar to FIG. 8, according to a sixth embodiment of the present invention.

Next, referring to FIG. 12, a description is made on a film feeding control device, with a photo interrupter, according to a sixth embodiment of the present invention.

FIG. 12 shows the photo interrupter 1F of the sixth embodiment. As shown in the figure, a supporting member 113F does not have a flange-like projecting part annular in shape like the one of the fifth embodiment. Instead, the supporting member 113F has separate, flange-like projecting parts 70aF, 70bF, 70cF and 70dF, each of which is fixed to and is contensive with its corresponding side 112aF, 112bF, 112cF and 112dF of the supporting member 113F, so that the flange-like projecting part has generally square shaped notches 700F at each corner thereof.

With the mounting structure of the sixth embodiment, the leaking of light passing between the supporting member 113F of the photo interrupter 1F and the inner surface of the opening of the camera frame inside which the supporting member 113F is inserted, is also fully prevented.

Also, with the mounting structure of the sixth embodiment, there is no need of any additional light intercepting member to be mounted on the camera frame, so that it is possible to reduce the number of assembling members for the mounting structure, which in turn reduces the assembling steps for the structure.

Figure 13:
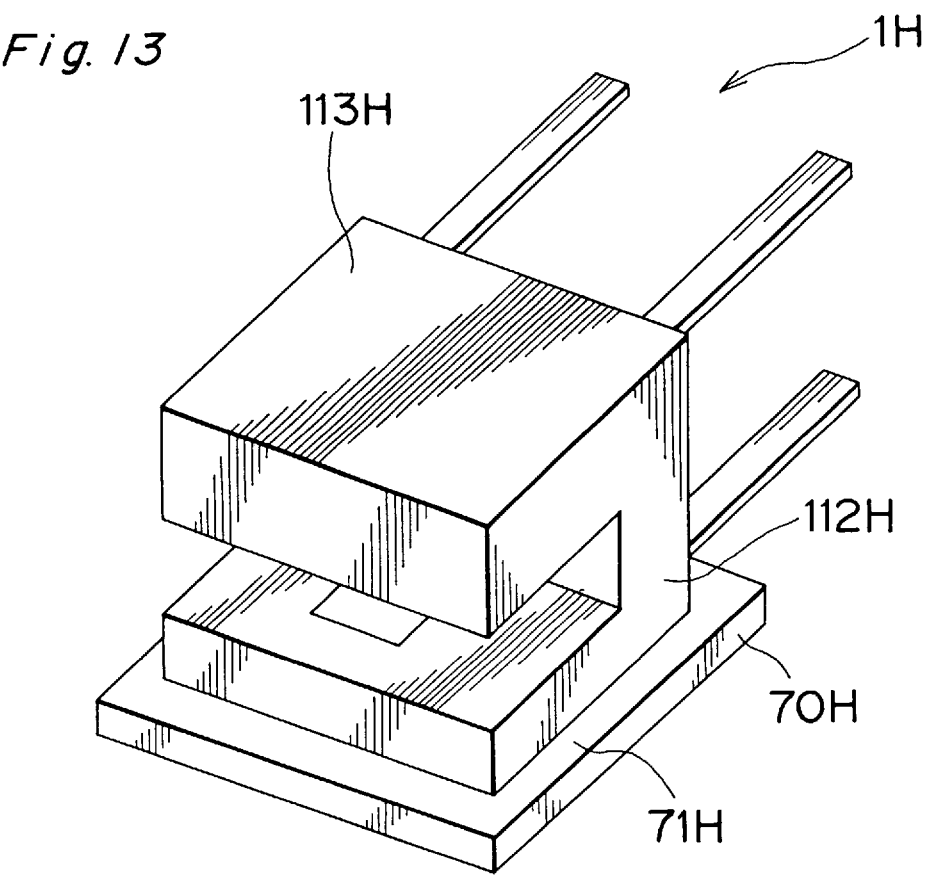
FIG. 13 is a perspective view of a photo interrupter according to a seventh embodiment of the present invention.
Figure 14:
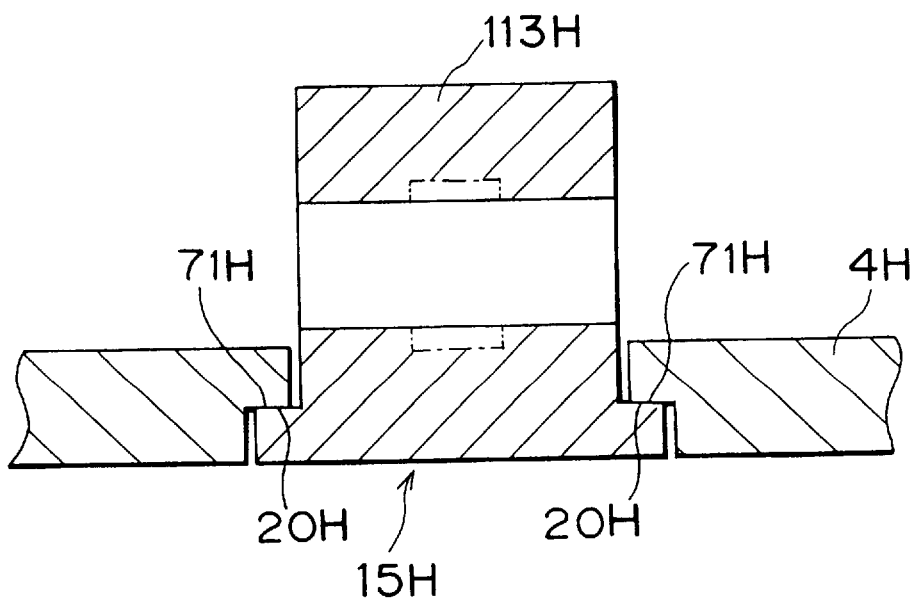
FIG. 14 is a sectional view, similar to FIG. 3, showing the photo interrupter of FIG. 13 and a mounting structure for mounting the photo interrupter on a camera frame.

Next, referring to FIGS. 13 and 14, a description is made of a film feeding control device, with a photo interrupter and a mounting structure for mounting the photo interrupter on a camera frame, according to a seventh embodiment of the present invention.

FIG. 13 illustrates the photo interrupter 1H as a perspective view, and FIG. 14 illustrates the mounting structure as a fragmentary sectional view. As shown in the figures, a supporting member 113H of the photo interrupter 1H is provided with a flange-like projecting part 70H around a peripheral side surface 112H of the supporting member 113H so that a surface, on the side facing the shutter, of the supporting member 113H, is level with a surface, on the same side, of the camera frame 4H.

In the seventh embodiment, a contacting surface 71H, of the supporting member 113H, contacting a contacting surface 20H of the camera frame 4H, is located on a side remote from the shutter or the photographing lens, as shown in FIG. 14. As apparent from the figure, after the supporting member 113H is inserted into the opening 15H of the camera frame 4H from the side facing the shutter, both the supporting member 113H of the photo interrupter 1H and the camera frame 4H are fixed to each other by any fixing means as mentioned above.

Figure 15:
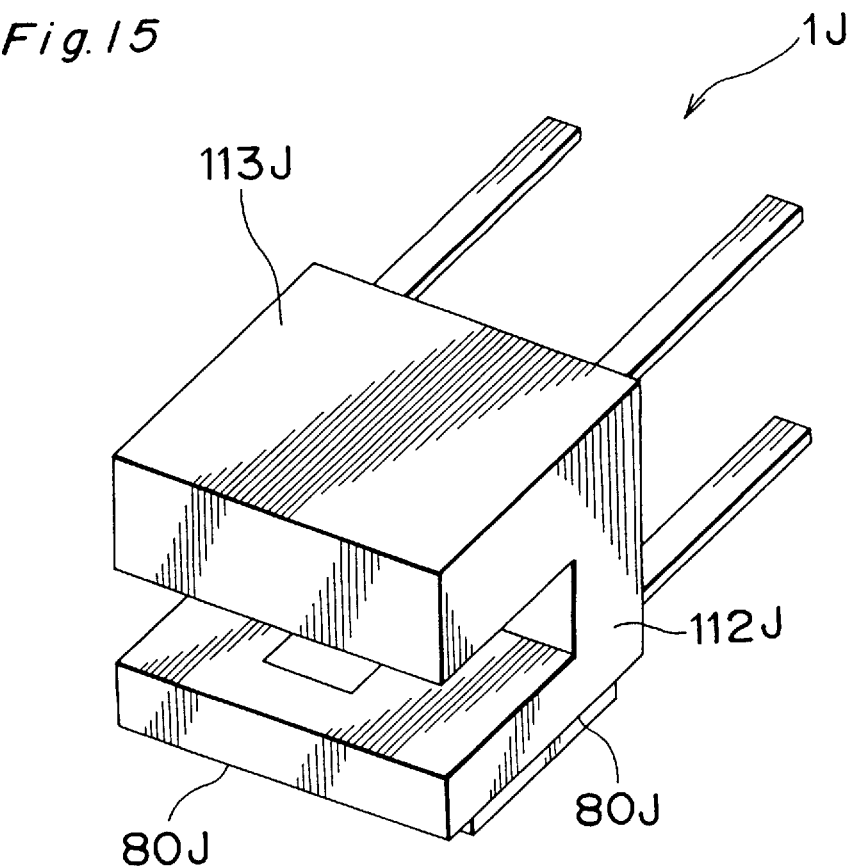
FIG. 15 is a perspective view of a photo interrupter according to an eighth embodiment of the present invention.
Figure 16:
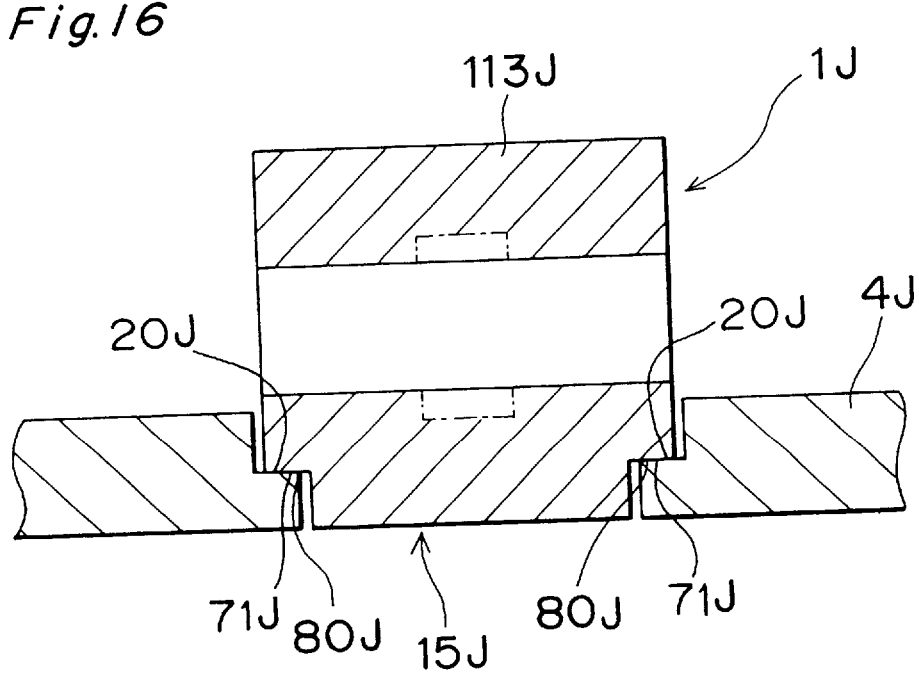
FIG. 16 is a sectional view, similar to FIG. 3, showing the photo interrupter of FIG. 15 and a mounting structure for mounting the photo interrupter on a camera frame.

Next, referring to FIGS. 15 and 16, a description is made on a film feeding control device with a photo interrupter and a mounting structure for mounting the photo interrupter on a camera frame, according to a eighth embodiment of the present invention.

FIG. 15 illustrates the photo interrupter 1J as a perspective view, and FIG. 16 illustrates its mounting structure as a fragmentary sectional view.

As shown in the figures, the supporting member 113J of the photo interrupter 1J has no flange-like projecting part. Instead, the side of the supporting member 113J facing of the shutter is formed as a step-like part 80J with a contacting surface 71J.

In order to mount the photo interrupter 1J on the camera frame 4J, the supporting member 113J is inserted into the opening 15J of the camera frame 4J from a side remote from the shutter until the contacting surface 71J of the photo interrupter contacts the stepped contacting surface 20J of the camera frame 4J, and then the supporting member 113J is fixed to the camera frame 4J by any fixing means as mentioned above.

Figure 17:
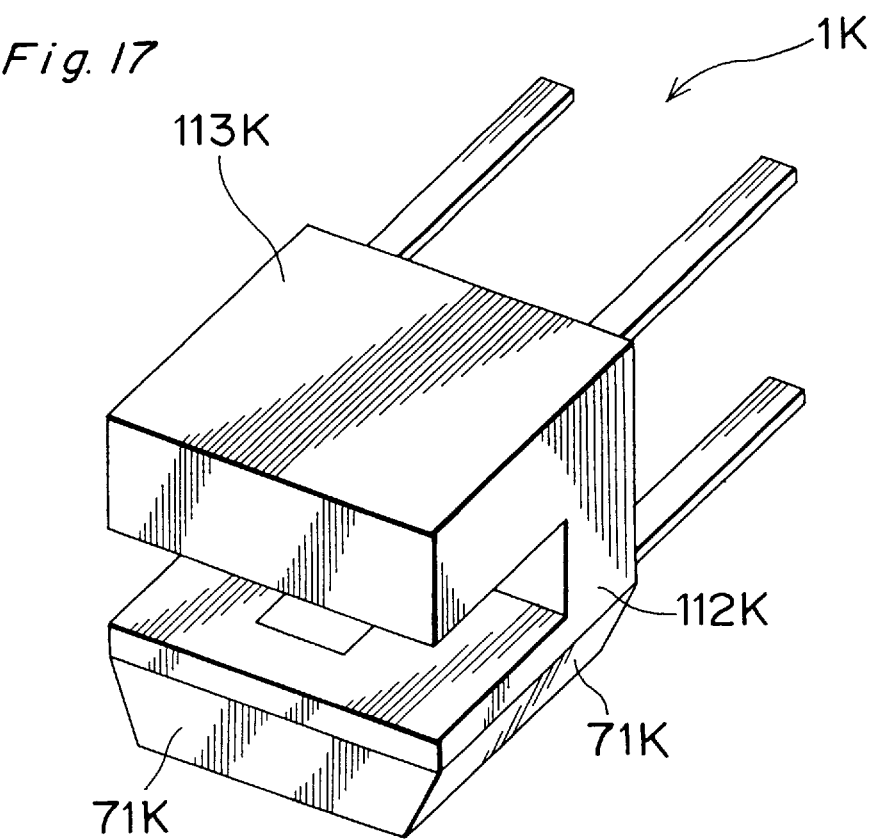
FIG. 17 is a perspective view of a photo interrupter according to a ninth embodiment of the present invention.
Figure 18:
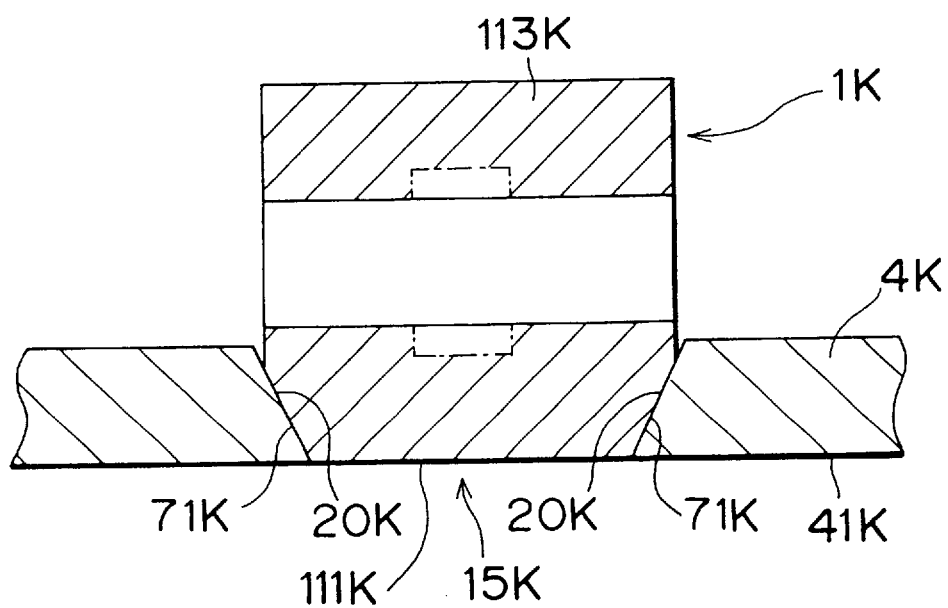
FIG. 18 is a sectional view, similar to FIG. 3, showing the photo interrupter of FIG. 17 and a mounting structure for mounting the photo interrupter on a part of a camera frame.

Next, referring to FIGS. 17 and 18, a description is made on a film feeding control device, with a photo interrupter and a mounting structure for mounting the photo interrupter on a camera frame, according to a ninth embodiment of the present invention.

FIG. 17 illustrates the photo interrupter 1K as a perspective view, and FIG. 18 illustrates its mounting structure as a fragmentary sectional view.

As shown in the figures, a supporting member 113K of the photo interrupter 1K has no flange-like projecting part like one shown in the fifth, sixth and seventh embodiments; Instead, camera frame 4K has an opening 15K, into which the supporting member 113K is inserted and where the opening is formed as a contacting surface 20K tapering inwardly towards the shutter or photographing lens. The peripheral surface 112K of the supporting member 113K, corresponding to the contacting surface 20K of the opening 15K of the camera frame 4K, is also formed as a contacting surface 71K tapering inwardly towards the shutter or photographing lens.

In order to mount the photo interrupter 1K on the camera frame 4K, the supporting member 113K is inserted into the opening 15K of the camera frame 4K from a side remote from the shutter until the contacting surface 71K of the photo interrupter 1K contacts the contacting surface 20K of the camera frame 4K, and then the supporting member 113K is fixed to the camera frame 4K by any fixing means as mentioned above, with a surface 111K, on the side facing the shutter or photographing lens, of the supporting member 113K of the photo interrupter 1K being level with a surface 41K, on the same side, of the part of the camera frame 4K.

According to the mounting structure, contacting surfaces 20K and 71K in the tapering form of the supporting member 113K of the photo interrupter 1K and the mounting part of the camera frame 4K prevents light coming in through the photographing lens and passing between the photo interrupter 1K and the camera frame 41K to undesirably expose the film to light.

Although the present invention has been fully described in connection with the preferred embodiments thereof with reference to the accompanying drawings, it is to be noted that various changes and modifications are apparent to those skilled in the art.

For example, although the film feeding control device with the photo interrupter and the mounting structure according to the embodiments above mentioned, is applied to the camera, the film feeding control device with the photo interrupter and the mounting structure of the present invention may also be applied to a printing apparatus.

Such changes and modifications are to be understood as included within the scope of the present invention as defined by the appended claims unless they depart therefrom.

What is claimed is:

1. A film feeding control device comprising:
   a frame which has an opening, and a guide surface along which a film is fed;
   a photo interrupter which is mounted in the opening of the frame, wherein the photo interrupter has a light source for emitting a light, a light detector for detecting the light emitted from the light source, and a holding member for holding the light source and the light detector;
   a fixing member for fixing the photo interrupter in the opening of the frame; and
   a shield member for shutting off a light passing through a chink between an inner peripheral surface forming the opening of the frame and an outer peripheral surface of the holding member of the photo interrupter so that light passing through the opening of the frame is substantially prevented.

2. The film feeding control device as claimed in claim 1, wherein the frame further comprises a first contact surface which is provided around the opening,
   wherein the photo interrupter further comprises a second contact surface which is provided around a side wall of the holding member and which contacts the first contact surface of the frame when the photo interrupter is mounted in the opening of the frame.

3. The film feeding control device as claimed in claim 2, wherein the photo interrupter is fixed in the opening of the frame so that the first and second contact surfaces are substantially parallel to a surface of the film fed.

4. The film feeding control device as claimed in claim 2, wherein the photo interrupter has a flange-like part on each side of the holding member, wherein the second contact surface is formed on the flange-like part.

5. The film feeding control device as claimed in claim 2, wherein the second contact surface is formed on a step-like part provided on the side wall of the holding member.

6. The film feeding control device as claimed in claim 2, wherein the fixing member comprises an adhesive, and the first contact surface of the frame and the second contact surface of the photo interrupter are fixed to each other by the adhesive.

7. The film feeding control device as claimed in claim 3, wherein a longitudinal edge with perforations of the film passes between the light source and the light detector of the photo interrupter, and the photo interrupter detects the number of perforations at a time of feeding the film.

8. A film feeding control device comprising:
- a frame which has an opening, and a guide surface along which a film is fed;
- a photo interrupter which is mounted in the opening of the frame, wherein the photo interrupter has a light source for emitting a light, a light detector for detecting the light emitted from the light source, and a holding member for holding the light source and the light detector; and
- a fixing member for fixing the photo interrupter in the opening of the frame;
- wherein the frame further comprises a first contact surface which is provided around the opening, and
- wherein the photo interrupter further comprises a second contact surface which is provided around a side wall of the holding member and which contacts the first contact surface of the frame when the photo interrupter is mounted in the opening of the frame, and
- wherein the first contact surface of the frame is formed tapering in a direction opposite the guide surface thereof, and the second contact surface of the photo interrupter is formed tapering so as to be complementary with respect to the first contact surface of the frame.

9. A film feeding control device which comprises:
- a frame, said frame having a first surface and a second surface opposite said first surface, wherein said second surface can be exposed to light, said frame having an opening extending therethrough from said first surface to said second surface; and
- a photo interrupter mounted in the opening of the frame, said photo interrupter including a light source for emitting a light, a light detector for detecting the light emitted from the light source, a holding member for holding the light source and the light detector, and a flange which is provided around the holding member;
- wherein said flange is adapted to shut off light passing through said opening in said frame from said first surface to said second surface so that light passing through the opening in said frame is substantially prevented.

10. The film feeding control device as claimed in claim 9, wherein the flange extends in a plane perpendicular to an optical axis along which the light travels between the light source and the light detector.

11. The film feeding control device as claimed in claim 9, wherein the flange extends in a plane parallel to an emitting surface of the light source and to a detecting surface of the light detector.

12. The film feeding control device as claimed in claim 9, wherein the flange provided around the holding member is in a continuous, annular square form.

13. The film feeding control device as claimed in claim 9, wherein the flange provided around the holding member is in a discontinuous, annular square form, wherein the flange comprises separate pieces, each of which corresponds to a side of the holding member.

14. The film feeding control device as claimed in claim 9, wherein the flange has a flat surface.

15. The film feeding control device as claimed in claim 14, wherein the flat surface is perpendicular to an optical axis along which the light travels between the light source and the light detector.

16. A method for mounting a photo interrupter element on a frame, comprising the steps of:
- providing the frame with an opening;
- providing the frame with a first contact surface around the opening;
- providing a holding member of the photo interrupter element with a second contact surface corresponding to the first contact surface of the frame, wherein the holding member holds a light source for emitting a light and a light detector for detecting the light emitted from the light source; and
- mounting the holding member of the photo interrupter element in the opening of the frame, with the first contact surface of the frame contacting the second contact surface of the frame;
- wherein the first contact surface of the frame is formed tapering, and
- wherein the second contact surface of the photo interrupter element is formed tapering so as to be complementary with respect to the first contact surface of the frame.

17. The method as claimed in claim 16, further comprising the step of fixing the first contact surface of the frame to the second contact surface of the holding member of the photo interrupter element by an adhesive.

18. A film feeding control device comprising:
- a frame, said frame having a guide surface along which a film can be fed and another surface opposite said guide surface, wherein said another surface can be exposed to light, said frame having an opening extending therethrough from said guide surface to said another surface, the opening being defined by an inner peripheral surface;
- a photo interrupter which is mounted in the opening of the frame, wherein the photo interrupter has a light source for emitting a light, a light detector for detecting the light emitted from the light source, and a holding member for holding the light source and the light detector;
- a fixing member for fixing the photo interrupter in the opening of the frame; and
- a shield member for preventing light from passing through a chink between the inner peripheral surface defining the opening of the frame and an outer peripheral surface of the holding member of the photo interrupter so that light passing through the opening of the frame is substantially prevented.

19. The film feeding control device as claimed in claim 18, herein said shield member comprises an opaque tape adhered to adjacent surfaces of the supporting member and the frame, which adjacent surfaces are level with respect to each other.

20. A film feeding control device comprising:
- a frame, said frame having a guide surface along which a film can be fed and another surface opposite the guide surface, herein said another surface can be exposed to light, said frame having an opening extending through said frame from said guide surface to said another surface and being defined by an inner peripheral surface;
- a photo interrupter having a light source for emitting a light, a light detector for detecting the light emitted from the light source, and a holding member for holding the light source and the light detector, the holding member having an outer peripheral surface; and a fixing member for mounting the photo interrupter in the opening of the frame so that the light source and the light detector are on opposite sides of said guide surface and on opposite sides of a film which is fed along said guide surface and so that there may be a chink between the outer peripheral surface of the holding member and the inner peripheral surface of the opening in the frame;

wherein the inner peripheral surface of the opening in the frame includes a first contact surface which is provided around the opening, and wherein the outer peripheral surface of the holding member of the photo interrupter includes a second contact surface which is provided around a side wall of the holding member and which contacts the first contact surface of the frame when the photo interrupter is mounted in the opening of the frame, and wherein the outer peripheral surface of the holding member and the inner peripheral surface of the opening in the frame are so shaped that a leaking of light from one side of the frame to an opposite side of the frame between the holding member and the frame in a direction of a thickness of the frame is effectively prevented.

21. The film feeding control device as claimed in claim 20, further comprising:

a perforation detector for detecting a perforation of the film based on a detecting signal outputted from the light detector; and a controller for controlling a film feeding operation in accordance with a detection of the perforation by the perforation detector.

22. The film feeding control device as claimed in claim 21, wherein the controller controls one of an amount of the film fed and a position of the film relative to an aperture in the film feeding control device.

23. The film feeding control device as claimed in claim 20, wherein the photo interrupter is so mounted in the opening of the frame that each of the first and second contact surfaces is substantially perpendicular to an optical axis along which light travels between the light source and the light detector.

24. The film feeding control device as claimed in claim 20, wherein each of the outer peripheral surface of the holding member of the photo interrupter element and the inner peripheral surface of the opening in the frame has a stepped configuration, with the stepped configuration of the outer peripheral surface of the holding member being complimentary to the stepped configuration of the inner peripheral surface of the opening in the frame.

25. The film feeding control device as claimed in claim 24, wherein the first contact surface is part of the stepped configuration of the inner peripheral surface of the opening in the frame and the second contact surface is part of the stepped configuration of the outer peripheral surface of the holding member.

26. The film feeding control device as claimed in claim 25, wherein each of the first and second contact surfaces is substantially perpendicular to an optical axis along which light travels between the light source and the light detector.

27. A film feeding control device comprising:

a frame, said frame having a guide surface along which a film can be fed and another surface opposite the guide surface, wherein said another surface can be exposed to light, said frame having an opening extending through said frame from said guide surface to said another surface and being defined by an inner peripheral surface;

a photo interrupter having a light source for emitting a light, a light detector for detecting the light emitted from the light source, and a holding member for holding the light source and the light detector, the holding member having an outer peripheral surface; and a fixing member for mounting the photo interrupter in the opening of the frame so that the light source and the light detector are on opposite sides of said guide surface and on opposite sides of a film which is fed along said guide surface and so that there may be a chink between the outer peripheral surface of the holding member and the inner peripheral surface of the opening in the frame;

wherein the inner peripheral surface of the opening in the frame includes a first contact surface which is provided around the opening, and wherein the outer peripheral surface of the holding member of the photo interrupter includes a second contact surface which is provided around a side wall of the holding member and which contacts the first contact surface of the frame when the photo interrupter is mounted in the opening of the frame, and wherein each of the first and second contact surfaces has a tapered configuration, with the tapered configuration of the first contact surface being complimentary to the tapered configuration of the second contact surface so that a leaking of light from one side of the frame to an opposite side of the frame between the holding member and the frame in a direction of a thickness of the frame is effectively prevented.

28. A film feeding control device comprising:

a light source for emitting a light;

a light detector for detecting the light emitted from the light source;

a U-shaped holding member having first and second legs, with a gap therebetween, for holding the light source on one of the first and second legs and the light detector on the other of the first and second legs so that the light source and the light detector face each other across the gap;

a frame having first and second surfaces with a stepped opening extending from the first surface to the second surface; and a stepped portion provided around the first leg for mounting the photo interrupter element in the stepped opening in the frame with a surface of the first leg which is most remote from the second leg being level with the one of the first and second surfaces of the frame which is more remote from the second leg, the stepped opening in the frame being complementary to the stepped portion so that light is prevented from passing all the way through between the holding member and the frame, wherein the stepped portion has a thickness which is smaller than a thickness of the first leg.

29. A film feeding control device as claimed in claim 28, wherein the stepped portion is a flange which extends in a plane which is parallel to an emitting surface of the light source and to a detecting surface of the light detector.

30. A film feeding control device as claimed in claim 28, wherein the stepped portion provided around the first leg is in a continuous, annular rectangular form.

31. A film feeding control device as claimed in claim 28, wherein the stepped portion is a flange which is provided around the first leg in a discontinuous, annular square form, wherein the flange comprises separate pieces each of which corresponds to a respective side of the first leg.

32. A film feeding control device as claimed in claim 28, wherein the stepped portion is a flange which extends in a plane perpendicular to an optical axis along which the light travels between the light source and the light detector.

33. A film feeding control device as claimed in claim 32, wherein the flange is positioned about the first leg so that a portion of the first leg is more remote from the second leg than is said flange.

34. A film feeding control device as claimed in claim 28, wherein the stepped portion has a flat surface which is perpendicular to an optical axis along which the light travels between the light source and the light detector.

35. A photo interrupter element mounted in a tapered opening of a frame, said photo interrupter element comprising:

a light source for emitting a light;

a light detector for detecting the light emitted from the light source;

a holding member for holding the light source and the light detector; and a contact surface which is provided around a side wall of the holding member and which contacts a contact surface formed in the tapered opening of the frame when the photo interrupter element is mounted in the opening of the frame;

wherein the contact surface of the photo interrupter element is formed tapering so as to be complementary with respect to the contact surface of the frame so that a light is substantially prevented from passing through said opening of a frame.

* * * * *

UNITED STATES PATENT AND TRADEMARK OFFICE
CERTIFICATE OF CORRECTION

PATENT NO. : 5,819,128
DATED : October 6, 1998
INVENTOR(S) : Nobumoto, et al

It is certified that error appears in the above-identified patent and that said Letters Patent is hereby corrected as shown below:

In column 13, line 1, claim 7, delete "3" and insert --2--.

In column 14, line 51, claim 19, delete "herein" and insert --wherein--.

In column 14, line 58, claim 20, delete "herein" and insert --wherein--.

Signed and Sealed this

Twelfth Day of October, 1999

Attest:

Q. TODD DICKINSON

Attesting Officer       Acting Commissioner of Patents and Trademarks